US012650661B2

(12) United States Patent
Nakane

(10) Patent No.: US 12,650,661 B2
(45) Date of Patent: Jun. 9, 2026

(54) SYSTEM INCLUDING CHARGE REMOVING APPARATUS, METHOD OF CONTROLLING SYSTEM, AND STORAGE MEDIUM

(71) Applicant: CANON KABUSHIKI KAISHA, Tokyo (JP)

(72) Inventor: Hiroyuki Nakane, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 19/024,996

(22) Filed: Jan. 16, 2025

(65) Prior Publication Data

US 2025/0244709 A1 Jul. 31, 2025

(30) Foreign Application Priority Data

Jan. 26, 2024 (JP) ................................ 2024-009867

(51) Int. Cl.
*G03G 21/06* (2006.01)
*G03G 15/00* (2006.01)
*G03G 15/02* (2006.01)

(52) U.S. Cl.
CPC ......... *G03G 21/06* (2013.01); *G03G 15/0266* (2013.01); *G03G 15/5016* (2013.01)

(58) Field of Classification Search
CPC ............. G03G 15/5016; G03G 15/502; G03G 15/6573; G03G 15/55
See application file for complete search history.

(56) References Cited

U.S. PATENT DOCUMENTS

2005/0062826 A1* 3/2005 Kim ..................... B65H 3/5261 347/104
2020/0379395 A1* 12/2020 Fukao .................... B65H 29/14
2021/0216027 A1* 7/2021 Tanaka ............... G03G 15/0266
2022/0397858 A1* 12/2022 Sugiyama ............ G03G 21/203

FOREIGN PATENT DOCUMENTS

JP H11258881 A 9/1999

* cited by examiner

*Primary Examiner* — Jessica L Eley
(74) *Attorney, Agent, or Firm* — Canon U.S.A., Inc. IP Division

(57) ABSTRACT

A method of controlling a system, the system including a printing apparatus configured to print an image on a sheet, and a charge removing apparatus configured to perform charge removing processing on the sheet on which the image is printed, includes controlling an application voltage of the charge removing processing based on a use amount of a recording material for one page of the image, determining whether a recording material placed region in the one page is deviated, and displaying, in a case where the recording material placed region in the one page is deviated, a screen for prompting a user to select whether to adjust the application voltage of the charge removing processing, on an operation unit.

18 Claims, 15 Drawing Sheets

FIG.13

1300

| | IMAGE 900 | IMAGE 1201 | IMAGE 1202 |
|---|---|---|---|
| FIRST REGION | 2396.8 M | 1498 M | 5992 M |
| SECOND REGION | 1797.6 M | 1498 M | 0 |
| THIRD REGION | 1797.6 M | 1498 M | 0 |
| FOURTH REGION | 0 | 1498 M | 0 |
| AVERAGE VALUE | 1498 M | 1498 M | 1498 M |
| VARIANCE VALUE (STANDARD DEVIATION) | 898.8 M | 0 | 2594.6 M |
| DEVIATION DETERMINATION OF TONER PLACED POSITION IN PAGE | ABSENT | ABSENT | PRESENT |

SYSTEM INCLUDING CHARGE REMOVING APPARATUS, METHOD OF CONTROLLING SYSTEM, AND STORAGE MEDIUM

BACKGROUND

Technical Field

The aspect of the embodiments relates to a system including a charge removing apparatus that removes charges of a charged recording medium, a method of controlling the system, and a storage medium.

Description of the Related Art

A recording medium (hereinafter, referred to as "sheet") used for printing work is conveyed in a state of being charged with static electricity due to residual charges in an electrophotographic process or slight friction with a conveyance roller and a guide during sheet conveyance. The static electricity may cause the sheets to adhere to each other. In addition, quality of printed matters may be deteriorated due to attachment of dust and paper powder.

A sheet of plain paper has low electric resistance. Charges thereof are easily moved within the sheet, and a charge amount thereof is small and quickly eliminated. A toner layer of toner placed on the sheet acts as a resistor. Thus, when the sheet type is the same, the charge mount of the sheet is increased as a toner use amount is increased, and charges easily remain. In a case of double-side printing, toner layers are formed on front and rear surfaces of the sheet. Thus, charge movement hardly occurs within the sheet. As a result, the charge amount of the sheet is increased as the toner use amount is increased, and the charges tends to easily remain.

If post-processing is performed in a state where the sheets adhere to each other, sheet aligning processing is affected. As a result, quality of the post-processing is deteriorated, and jam may be induced during the post-processing.

Therefore, to prevent occurrence of such a risk, it is desirable to remove static electricity of the sheet after a printing step before the post-processing is performed. Accordingly, a technique for removing charges on the sheet by applying a voltage to a conveyance roller pair positioned downstream in a sheet conveyance direction has been discussed (see Japanese Patent Application Laid-Open No. H11-258881).

In charge removal by a configuration in which a voltage is applied to a conveyance roller (hereinafter, referred to as "charge removing roller"), charges opposite to charges on the sheet are applied to the sheet via the charge removing roller to eliminate the static electricity. Thus, it is necessary to perform charge removing control by the charge removing roller (application of the charges opposite to the charges on the sheet to the charge removing roller) based on a charge amount of the sheet. This means that there is a charge adjustment value optimum for charge removal for each printing environment, such as humidity, and each sheet type. If the charge removing control is performed on the sheet in a state where the charge adjustment is not suitable, the sheet may be contrarily charged, which may cause further adhesion of the sheets.

In a step of finding an application voltage value optimum for charge removal (hereinafter, referred to as "adjustment step"), an application voltage value optimum for charge removal of the sheet conveyed from the printing apparatus is determined by setting the application voltage value in the charge removing apparatus including the charge removing roller. The application voltage value determined in the adjustment step is the optimum application voltage value for the printing environment and the sheet type used in the adjustment step.

In a toner placed region of a job actually input by a user, a toner layer acts as a resistor. Thus, the application voltage value may not be optimum due to a toner use amount and an area of the toner placed region, which may lead to adhesion of sheets. While a print job to be input by the user may be used in the adjustment step, since it is necessary to perform the adjustment step every time before input of a job, it is troublesome. Further, in a case where the job includes a plurality of pages, the optimum application voltage value is varied depending on the page, which may also lead to adhesion of sheets. Therefore, the toner use amount and the area of the toner placed region for each page may be previously calculated, and the optimum application voltage may be set for each page. Thus, suitable printed matters are provided without causing adhesion of discharged sheets.

However, by the method, the same application voltage value is set when the toner use amount or the area of the toner placed region are the same. In a case where a toner placed position is deviated to one portion of the sheet, the application voltage value becomes unsuitable, and electrostatic adhesion may occur.

SUMMARY

According to an aspect of the embodiments, a system including a printing apparatus configured to print an image on a sheet, and a charge removing apparatus configured to perform charge removing processing on the sheet on which the image is printed, includes a control unit configured to control an application voltage of the charge removing processing based on a use amount of a recording material for one page of the image, a determination unit configured to determine whether a recording material placed region in the one page is deviated, and a display unit configured to, in a case where the recording material placed region in the one page is deviated, display a screen for prompting a user to select whether to adjust the application voltage of the charge removing processing, on an operation unit.

Further features of the disclosure will become apparent from the following description of exemplary embodiments with reference to the attached drawings.

BRIEF DESCRIPTION OF THE DRAWINGS

FIG. 13 is a table for calculating deviation of a toner placed position.

DESCRIPTION OF THE EMBODIMENTS

An exemplary embodiment of the disclosure is illustratively described in detail below with reference to the drawings. Components described in the present exemplary embodiment are illustrative, and the scope of the disclosure is not limited thereto.

Entire Configuration of System

Figure 1:
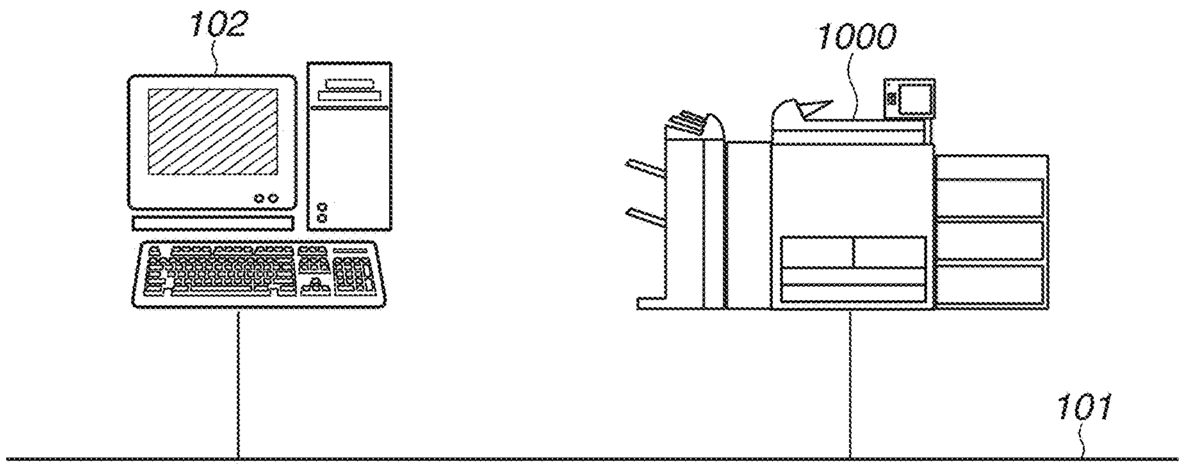
FIG. 1 is a configuration diagram of a minimum system according to an exemplary embodiment.

FIG. 1 illustrates a simplest configuration according to the present exemplary embodiment. A printing system 1000 and a client computer 102 (hereinafter, referred to as "personal computer (PC)") that is an information processing apparatus are mutually connected via a network 101. The PC 102 can transmit page-description language (PDL) code data that is a print job to the printing system 1000 via the network 101.

Hardware Configuration of Printing System

Figure 2:
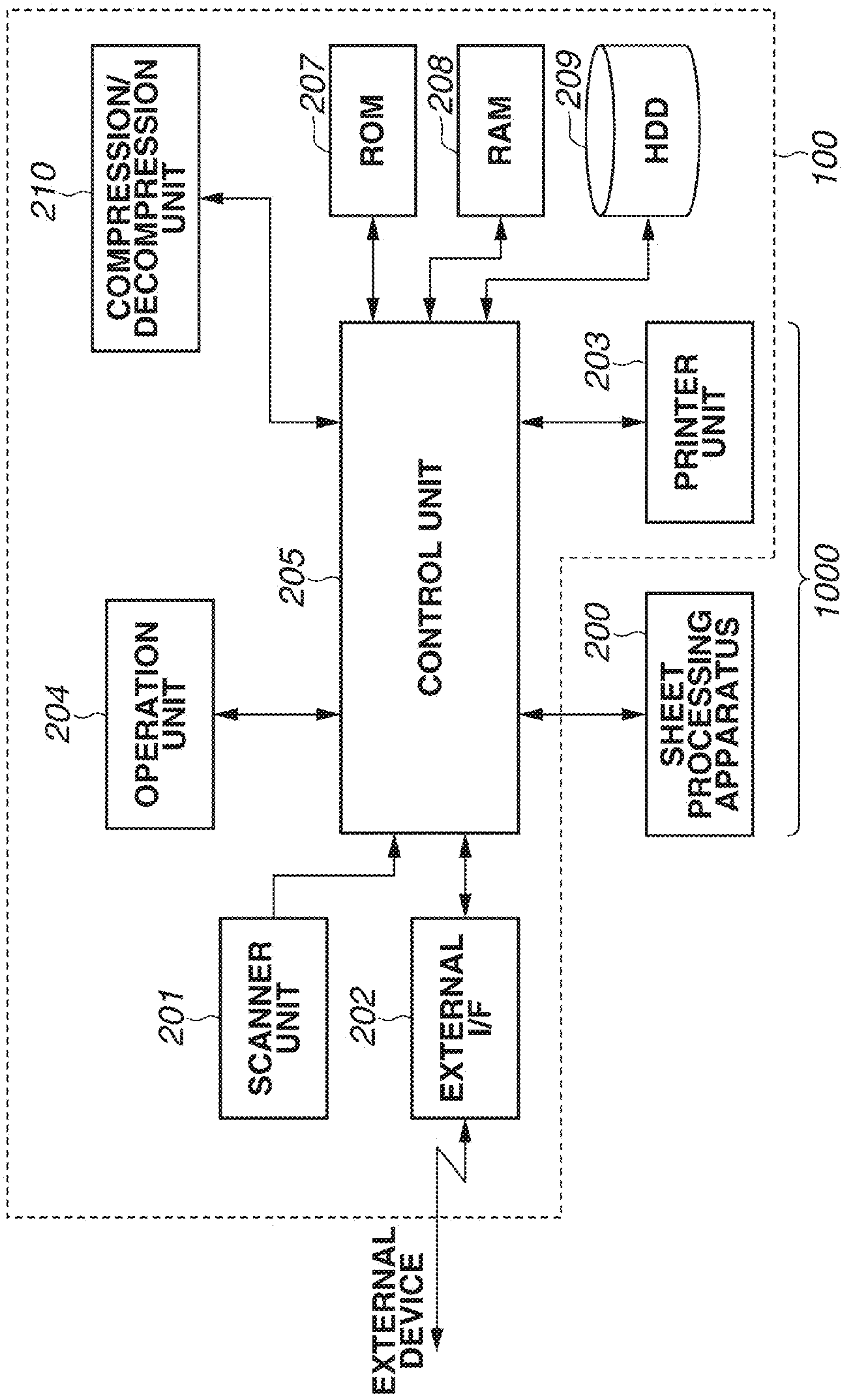
FIG. 2 is a block diagram of hardware of a printing apparatus.

FIG. 2 is a block diagram illustrating a hardware configuration of the printing system 1000.

Figure 3:
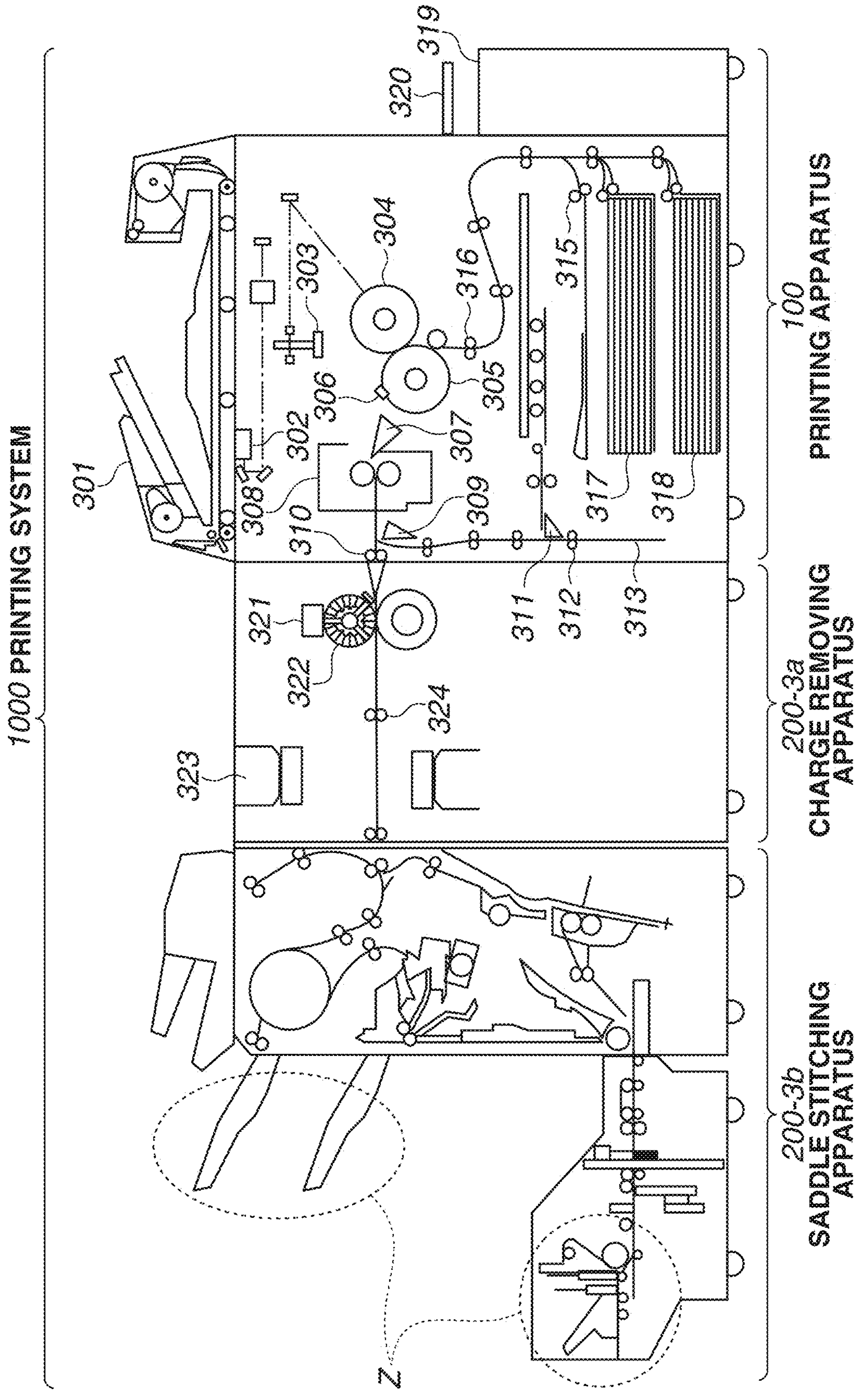
FIG. 3 is a cross-sectional view of a printing system.

The printing system 1000 includes a printing apparatus 100 that is a portion surrounded by a dotted line in FIG. 3, and a sheet processing apparatus 200. Any number of sheet processing apparatuses 200 can be connected to the printing apparatus 100. In the present exemplary embodiment, as the printing apparatus 100, a multifunction peripheral (MFP) including a plurality of functions such as a copy function and a print function is described as an example. However, the printing apparatus 100 may be a single-function printing apparatus including the copy function or the print function. In the present exemplary embodiment, as an example, the printing system 1000 includes various kinds of components described below.

The printing system 1000 is configured such that the sheet processing apparatus 200 connected to the printing apparatus 100 can perform sheet processing on a sheet printed by the printing apparatus 100. However, the printing system 1000 may include only the printing apparatus 100 without the sheet processing apparatus 200 being connected.

The sheet processing apparatus 200 is configured to be communicable with the printing apparatus 100, and can perform the sheet processing described below in response to an instruction from the printing apparatus 100.

(Printing Apparatus)

A scanner unit 201 reads an image on a document, converts the read image into image data, and transfers the image data to another unit. An external interface (I/F) 202 performs transmission and reception of data with another apparatus connected to the network 101.

Figure 4:
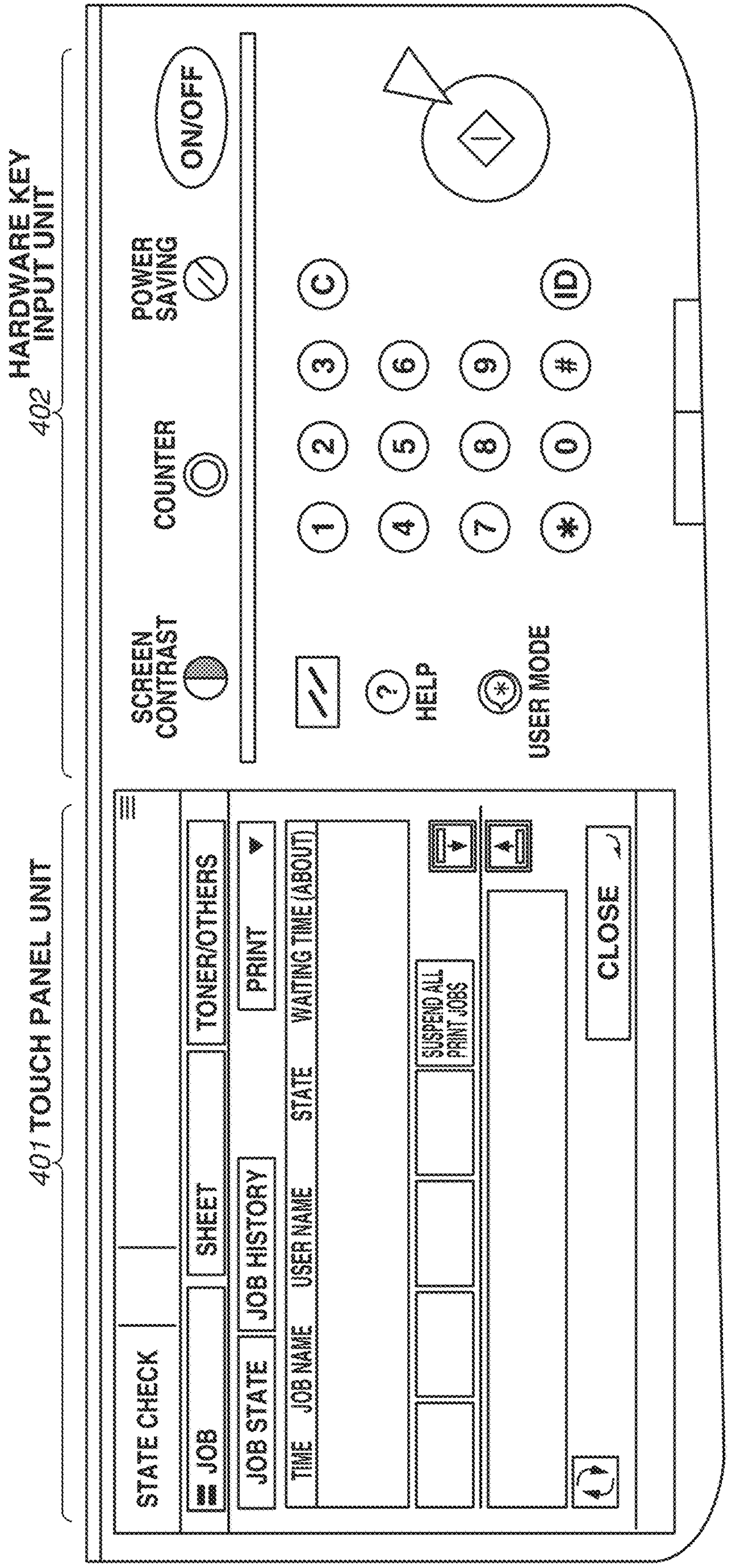
FIG. 4 is an exemplary diagram of an operation unit provided in the printing apparatus.

A printer unit 203 prints, on the sheet, an image based on the input image data. An operation unit 204 has a configuration as illustrated in FIG. 4, and includes a hardware key input unit (key input unit) 402 and a touch panel unit 401. The operation unit 204 receives an instruction from a user via these units. Further, the operation unit 204 performs various kinds of display on the touch panel unit 401 included in the operation unit 204.

A control unit 205 is, for example, a central processing unit (CPU). The control unit 205 totally controls processing, operation, and the like of various kinds of units included in the printing system 1000. In other words, the control unit 205 controls operation of the printing apparatus 100 and the sheet processing apparatus 200 connected to the printing apparatus 100.

A read only memory (ROM) 207 stores various kinds of computer programs to be executed by the control unit 205. For example, the ROM 207 stores programs for causing the control unit 205 to perform various kinds of processing in flowcharts described below, and display control programs for displaying various kinds of setting screens described below. The ROM 207 also stores a program for causing the control unit 205 to interpret and develop the PDL code data received from the PC 102 that is the information processing apparatus, into raster image data (image data). In addition, the ROM 207 stores a boot sequence, font information, and the like.

A random access memory (RAM) 208 stores the image data and the PDL code data transmitted from the scanner unit 201 and the external I/F 202, various kinds of programs loaded from the ROM 207, and setting information. The RAM 208 also stores information about the sheet processing apparatus 200 (e.g., information about a type and functions of each sheet processing apparatus 200 connected to the printing apparatus 100). The control unit 205 can use the information about the sheet processing apparatus 200 stored in the RAM 208 to perform control.

A hard disk drive (HDD) 209 includes a hard disk, and a driving unit that perform reading and writing of data from and to the hard disk. The HDD 209 is a large-capacity storage device for storing scanned image data that has been input from the scanner unit 201 and compressed by a compression/decompression unit 210. The control unit 205 can print the image data stored in the HDD 209 by using the printer unit 203 in response to an instruction from the user. The HDD 209 is also used as a spooler. The control unit 205 can manage the PDL code data received from the PC 102 as a print job and store the print job in the HDD 209. In addition, the control unit 205 can manage the print job stored in the HDD 209 and acquire the number of stored print jobs and setting information in the print job.

The compression/decompression unit 210 performs compression/decompression operations on the image data stored in the RAM 208 and the HDD 209 by using various kinds of compression methods such as Joint Bi-level Image Experts Group (JBIG) and Joint Photographic Experts Group (JPEG).

An application voltage value optimum for each sheet type is previously stored as a sheet parameter in the HDD 209. The sheet parameter is a value written by default as a recommended value for each sheet type at factory shipment of the printing apparatus 100. When the user turns on a charge removing function and selects a sheet to be printed, the application voltage value set to the selected sheet type is read from the HDD 209 and applied. In a case where the control unit 205 receives the application voltage value for the sheet determined in an adjustment step via the operation unit 204, the control unit 205 updates the sheet parameter corresponding to the sheet type, and stores the updated sheet parameter in the HDD 209. Further, the control unit 205 calculates a toner use amount when printing is performed on the sheet from the input image data or the image data stored in the HDD 209, further adjusts the application voltage value stored in the HDD 209 based on the toner use amount, and determines an optimum application voltage value.

Detailed Configuration of Printing System

A configuration of the printing system 1000 is described with reference to FIG. 3. FIG. 3 is a cross-sectional view of the printing apparatus 100 and the sheet processing apparatus 200 connected to the printing apparatus 100. In FIG. 3, the sheet processing apparatus 200 includes a charge removing apparatus 200-3*a* and a saddle stitching apparatus 200-3*b*.

(Printing Apparatus)

First, the printing apparatus 100 is described.

An automatic document feeder (ADF) 301 sequentially separates a bundle of documents set on a loading surface of a document tray in order from a first page, and conveys each document to a document platen glass in order to scan the documents by a scanner 302.

The scanner 302 reads an image of a document conveyed to the document platen glass and converts the read image into image data by a charge-coupled device (CCD).

A rotary polygon mirror (polygon mirror) 303 receives a light beam, such as a laser beam, modulated based on the image data and applies the light beam as reflection scanning light to a photosensitive drum 304 via a reflection mirror.

A latent image formed on the photosensitive drum 304 by the laser beam is developed with toner, and a toner image is transferred to a sheet adhering to a transfer drum 305. Such a series of image forming processes is sequentially performed on yellow (Y) toner, magenta (M) toner, cyan (C) toner, and black (K) toner. As a result, a full-color image is formed. After the series of image forming processes is performed four times, the sheet, on which the full-color image has been formed, on the transfer drum 305 is separated by a separation claw 306 and is conveyed to a fixing unit 308 by a pre-fixing conveyer 307.

The fixing unit 308 includes a combination of rollers and a belt, internally includes a heat source such as a halogen heater, and fuses and fixes the toner on the sheet on which the toner image has been transferred, with heat and pressure.

A sheet discharge flapper 309 is configured to be pivotable around a pivot shaft, and regulates a conveyance direction of the sheet. When the sheet discharge flapper 309 is pivoted in a clockwise direction in the drawing, the sheet is straightly conveyed and is discharged to the outside of the apparatus by a sheet discharge roller 310.

The control unit 205 controls the printing apparatus 100 to perform single-side printing by a series of sequences described above.

On the other hand, in a case where images are to be formed on both surfaces of the sheet, the sheet discharge flapper 309 is pivoted in a counterclockwise direction in the drawing. The conveyance direction of the sheet is changed to a downward direction, and the sheet is sent to a double-side conveyance unit. The double-side conveyance unit includes a reversing flapper 311, a reversing roller 312, a reversing guide 313, and a double-side tray.

The reversing flapper 311 is pivoted around a pivot shaft to regulate the conveyance direction of the sheet. In a case where a double-side print job is processed, the control unit 205 performs control to send the sheet, a first surface of which has been printed by the printer unit 203, to the reversing guide 313 via the reversing roller 312 by pivoting the reversing flapper 311 in the counterclockwise direction in the drawing. Then, in a state where a trailing end of the sheet is pinched by the reversing roller 312, the control unit 205 stops the reversing roller 312 once, pivots the reversing flapper 311 in the clockwise direction in the drawing, and rotates the reversing roller 312 in an opposite direction. As a result, the control unit 205 performs control to switch back and convey the sheet, and to guide the sheet to the double-side tray in a state where the trailing end and a leading end of the sheet are changed in position.

The sheet is once loaded on the double-side tray. Then, again, the sheet is sent to a registration roller 316 by a refeeding roller 315. At this time, the sheet is sent while a second surface opposite to the first surface that has been subjected to a transfer step faces the photosensitive drum 304. Then, an image for the second surface is formed on the second surface of the sheet in a manner similar to the above-described processes. As a result, the images are formed on both surfaces of the sheet. The sheet is subjected to a fixing step, and then discharged from the inside to the outside of the printing apparatus 100 via the sheet discharge roller 310.

The control unit 205 controls the printing apparatus 100 to perform double-side printing by the above-described series of sequences.

The printing apparatus 100 further includes a sheet feeding unit storing sheets used for the printing apparatus. The sheet feeding unit includes sheet feeding cassettes 317 and 318 (that can each store, for example, 500 sheets), a sheet feeding deck 319 (that can store, for example, 5000 sheets), and a manual feeding tray 320. Various kinds of sheets different in size and material can be distinctively set in the sheet feeding cassettes 317 and 318 and the sheet feeding deck 319. In addition, various kinds of sheets including a special sheet such as an overhead projector (OHP) sheet can be set in the manual feeding tray 320.

(Charge Removing Apparatus)

Next, the charge removing apparatus 200-3*a* is described.

Figure 5:
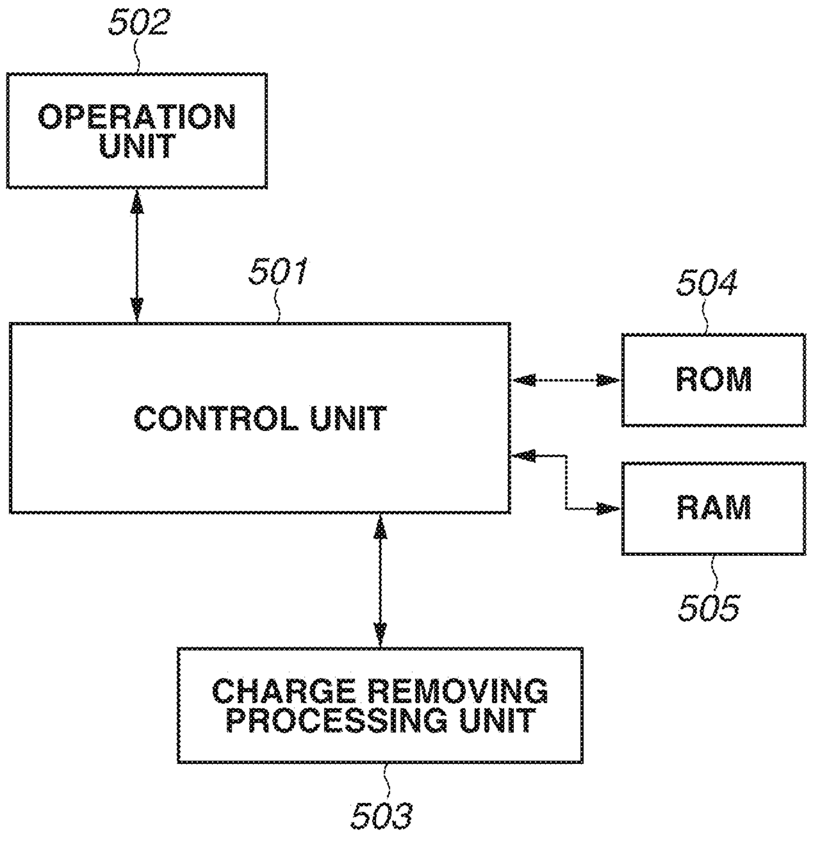
FIG. 5 is a system block diagram of a charge removing apparatus.

FIG. 5 is a system block diagram of the charge removing apparatus 200-3*a*. The charge removing apparatus 200-3*a* includes a control unit 501 separately from the control unit 205 of the printing apparatus 100. The control unit 501 is, for example, a CPU. The control unit 501 totally controls the entire charge removing apparatus 200-3*a* while communicating with the control unit 205 of the printing apparatus 100 illustrated in FIG. 2 via a bus (not illustrated).

<Operation Unit>

Figure 6:
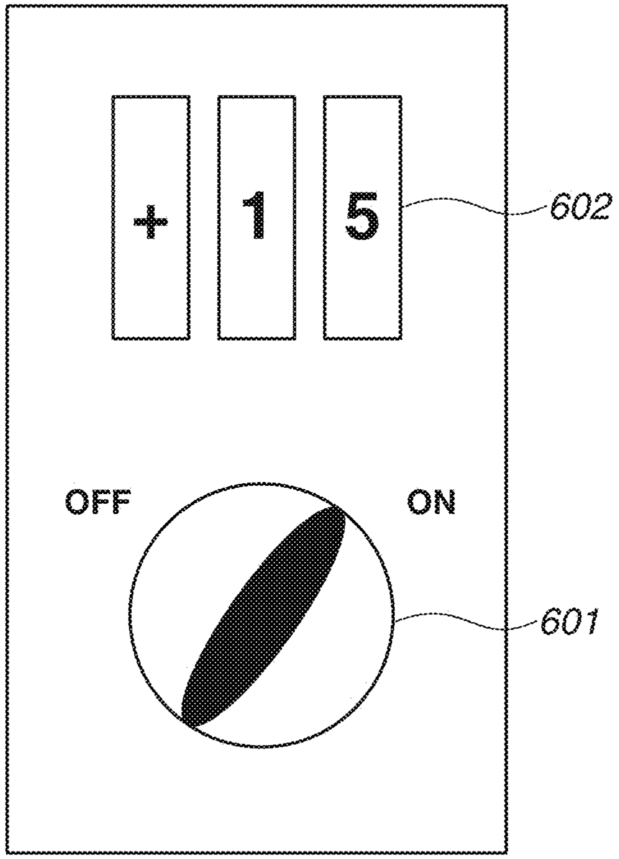
FIG. 6 is an exemplary diagram of an operation unit provided in the charge removing apparatus.

An operation unit 502 has a configuration as illustrated in FIG. 6. The user can perform setting of the charge removing apparatus 200-3*a* via the operation unit 502.

A mode setting switch 601 illustrated in FIG. 6 is to switch between execution and inexecution (ON/OFF) of charge removing processing by the charge removing apparatus 200-3*a*. In one embodiment, when the switch is ON, the control unit 501 controls a charge removing processing unit 503 described below to perform the charge removing processing.

An adjustment dial 602 that is a thumbwheel switch is used to adjust intensity of charge removing control performed when the mode setting switch 601 is ON. The adjustment dial 602 is controlled by the control unit 501 so as to be enabled when the mode setting switch 601 is ON. The adjustment dial 602 is used to set a value of voltage to be applied from a voltage application controller 321 to a charge removing roller 322, and a value between "00" and "99" is settable.

For example, when the adjustment dial 602 is set to "10", the application voltage value of +1.0 [kV] is set. In a case where the maximum application voltage of the charge removing roller 322 is +6.0 [kV], even when the adjustment dial 602 is set to any value between "61" to "99", the application voltage value is fixed to +6.0 [kV], and an application voltage greater than +6.0 [kV] is not settable. Generally, after the application voltage value optimum for a sheet used in an environment is adjusted and derived, the adjustment dial 602 is set to the application voltage value, and printing is performed.

For example, in the adjustment step, by setting the application voltage value of +6 [kV] to a sheet charged to −6 [kV] during transfer, a charge amount of the sheet becomes 0 [kV] (charges are removed).

In this case, by setting the adjustment dial 602 to "60", the voltage application controller 321 performs control to charge the charge removing roller 322 to +6 [kV], and then, the charge removing processing is performed on the conveyed sheet. The optimum application voltage value is varied depending on sheet characteristics and a use environment of the charge removing apparatus 200-3*a*. Thus, in a case where printing is performed on a sheet that has easily-chargeable characteristics, printing processing is started after the application voltage value is derived in the adjustment step before printing. In the present exemplary embodiment, as the configuration of the operation unit 502, the physical mode setting switch and the physical thumb-wheel switch are described. Alternatively, a display, ON/OFF setting, and change of the application voltage value may be performed on a user interface (UI) of the touch panel unit 401 (FIG. 4) of the operation unit 204. In this case, the control unit 205 of the printing apparatus 100 communicates with the control unit 501 via the bus (not illustrated), and provides information input to the operation unit 204 to the control unit 501. The control unit 501 having received the information provides information for the charge removing processing described below, to the charge removing processing unit 503.

The charge removing processing unit 503 includes the charge removing roller 322 and an ionizer 323 which are described below, and the voltage application controller 321 for these components. The charge removing processing unit 503 performs the charge removing processing on the conveyed sheet. The control unit 501 implements control for applying the voltage to the charge removing roller 322 and the ionizer 323 via the voltage application controller 321.

A ROM 504 stores a boot program of the charge removing apparatus 200-3*a*, a control program of the operation unit 502, a charge removing processing program of the charge removing processing unit 503, and the like. The control unit 501 appropriately loads a program from the ROM 504 to a RAM 505, and executes the program.

Charge Removing Processing

Figure 7:
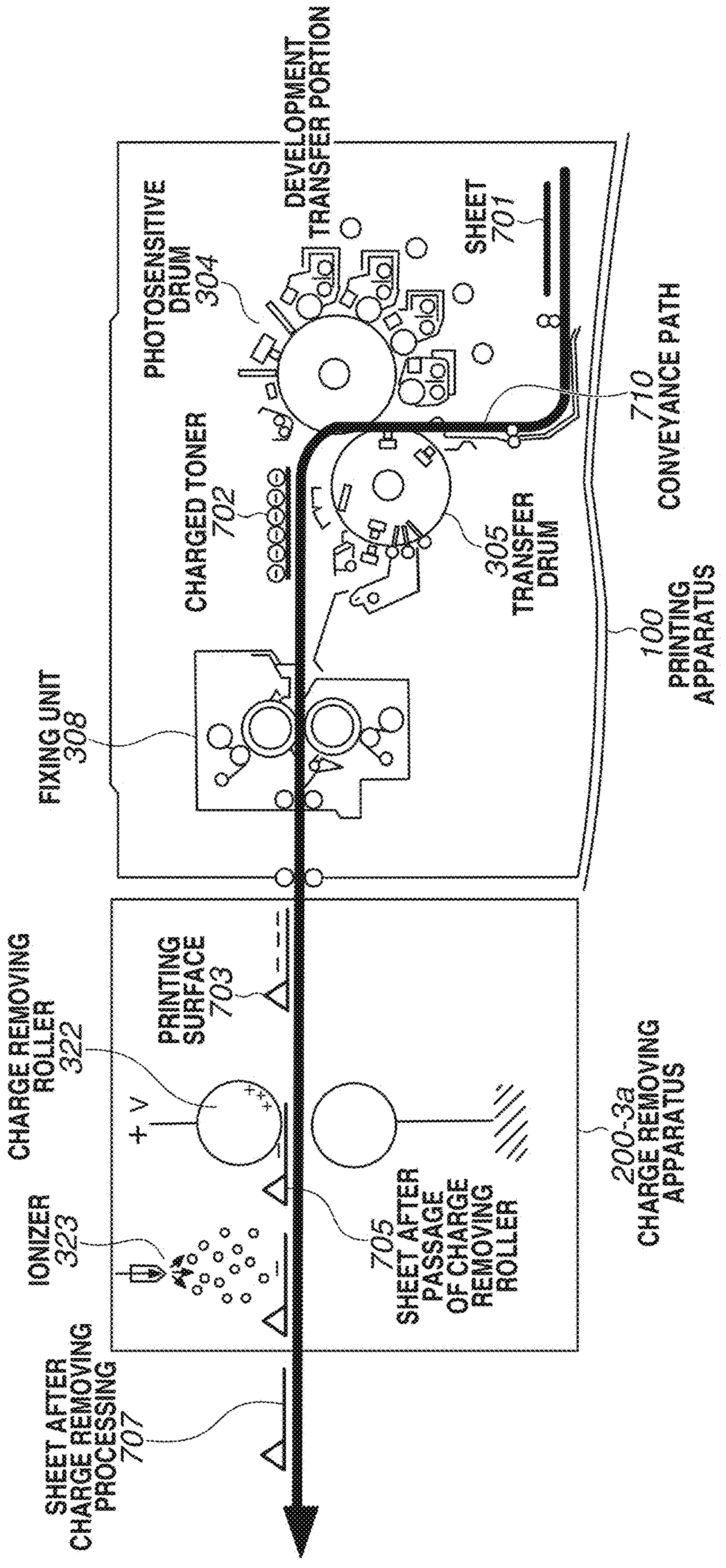
FIG. 7 is a schematic diagram illustrating charge removing processing.

The charge removing processing performed by the charge removing processing unit 503 is described with reference to FIG. 7. FIG. 7 is a diagram schematically illustrating a state where the charge removing apparatus 200-3*a* performs the charge removing processing on the sheet subjected to the printing processing by the printing apparatus 100. First, a sheet 701 is conveyed to a development transfer portion including the photosensitive drum 304 and the transfer drum 305, via a conveyance path 710, and toner is placed on the sheet 701. Charged toner 702 placed on the sheet 701 is negatively charged. The sheet subjected to fixing processing by passing through the fixing unit 308 is conveyed to the charge removing apparatus 200-3*a* in a state where a printing surface 703 is negatively charged.

The charge removing apparatus 200-3*a* includes the charge removing roller 322 positively charged. The charge removing apparatus 200-3*a* applies positive charges (application voltage value) to the printing surface 703 negatively charged, by contact charge removal of the charge removing roller 322 to eliminate a charged state. The charge removing roller 322 performs the charge removing processing at the application voltage value set by the control unit 501. When the control unit 501 changes the charge amount to change the voltage applied to the sheet in the middle of the sheet, a charge removing effect can be changed for each region within one sheet. However, it is assumed that negative charges not removed in the charge removing processing by the charge removing roller 322 or positive charges contrarily charged remain on a sheet 705 after passage of the charge removing roller.

Therefore, the charge removing apparatus 200-3*a* according to the present exemplary embodiment further includes the ionizer 323 downstream of the charge removing roller 322. The ionizer 323 generates corona discharge by applying a voltage to an electrode needle included in the ionizer 323, thereby removing charges by using ions generated by the corona discharge. In this way, the charges are roughly removed by the charge removing roller 322, and the residual charges are further treated by the ionizer 323, thereby a sheet 707 after the charge removing processing, which is discharged from the charge removing apparatus 200-3*a*, is in a state where the charges are removed.

Description is again provided with reference to the cross-sectional view in FIG. 3. The charge removing apparatus 200-3*a* includes the charge removing roller 322 and a counter roller. The sheet conveyed to the charge removing apparatus 200-3*a* is conveyed while being pinched by the both rollers, and is subjected to rough charge removal by the above-described charge removing roller 322. Then, the sheet is subjected to residual charge removing processing by the ionizer 323 while being conveyed to the outside of the apparatus by a conveyance roller 324.

(Saddle Stitching Apparatus)

The saddle stitching apparatus 200-3*b* is described. Sheet processing performed by the saddle stitching apparatus 200-3*b* includes, for example, saddle stitching, punching, trimming processing, shifted sheet discharge processing, folding processing, and stapling processing. A job for performing the above processing is referred to as a "saddle stitching job".

In a case where the saddle stitching job is processed, first, the control unit 205 conveys the sheet of the job printed by the printing apparatus 100 to the saddle stitching apparatus 200-3*b*. Next, the control unit 205 causes the saddle stitching apparatus 200-3*b* to perform the sheet processing of the job. Then, the control unit 205 causes a discharge destination Z of the saddle stitching apparatus 200-3*b* to hold a printed document of the saddle stitching job subjected to the sheet processing by the saddle stitching apparatus 200-3*b*. The discharge destination Z includes a plurality of discharge destination candidates. These discharge destination candidates are used when the saddle stitching apparatus 200-3*b* can perform a plurality of types of sheet processing and a separate discharge destination is used for individual sheet processing. In the present exemplary embodiment, description of a detailed conveyance procedure of the saddle stitching job is omitted.

Charge Removing Setting Processing

The processing performed in the present exemplary embodiment is described with reference to the flowchart in FIG. 8. For purpose of description, a received print job is a job for printing an image 900 illustrated in FIG. 9 and images 1201 and 1202 illustrated in FIG. 12, and a flow of processing for removing charges is described. Each of the image 900 and the images 1201 and 1202 is A4 data. The term "image" used herein refers to an image formed in each page of the print job before raster image processor (RIP) processing. In the present exemplary embodiment, as the print job, a PDL print job is described; however, the print job may be another print job, for example, a copy job.

In step S801, the control unit 205 of the printing apparatus 100 acquires an ON/OFF state of the charge removing processing of the charge removing apparatus 200-3*a*. In the processing, the control unit 501 of the charge removing apparatus 200-3*a* having received an inquiry from the control unit 205 of the printing apparatus 100 acquires a state of the mode setting switch 601 and the application voltage value set by the adjustment dial 602 on the operation unit 502 of the charge removing apparatus 200-3*a*. Then, the control unit 501 of the charge removing apparatus 200-3*a* returns the ON/OFF state of the charge removing processing of the charge removing apparatus 200-3*a* and the application voltage value to the control unit 205 of the printing apparatus 100.

In step S802, the control unit 205 of the printing apparatus 100 displays the ON/OFF state of the charge removing processing of the charge removing apparatus 200-3*a* and the application voltage value acquired in step S801 on the operation unit 204 of the printing apparatus 100.

In step S803, the control unit 205 of the printing apparatus 100 determines whether a print job has been input. In a case where a print job has not been input (NO in step S803), the processing returns to step S801, and the control unit 205 continuously displays the ON/OFF state of the charge removing processing. In contrast, in a case where a print job has been input (YES in step S803), the processing proceeds to step S804.

Figure 9:
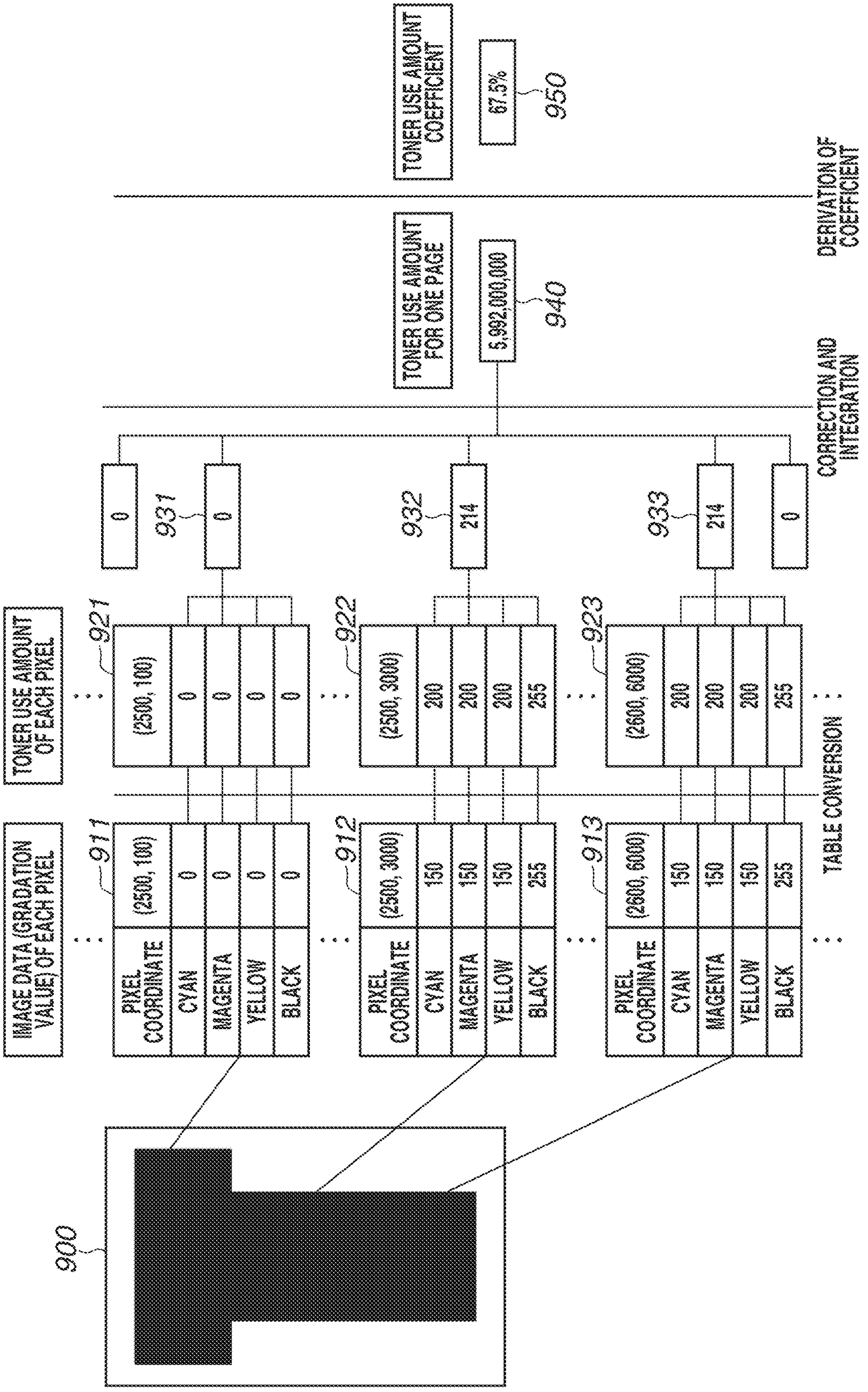
FIG. 9 is a diagram illustrating a print job example.

In step S804, the control unit 205 interprets the image 900 as PDL data, and performs the RIP processing. FIG. 9 illustrates image data 911 to 913. Each of the image data 911 to 913 is an example of a coordinate value of one pixel of the image 900 and gradation values (0 to 255) of cyan, magenta, yellow, and black (CMYK) of the one pixel converted as image data. For example, the image data 911 indicates that a color of (C, M, Y, K)=(0, 0, 0, 0) is placed on a pixel at a coordinate (2500, 100).

In step S805, the control unit 205 acquires the ON/OFF state of the charge removing processing of the charge removing apparatus 200-3*a*.

In a case where the charge removing processing is ON (YES in step S805), the processing proceeds to step S806. In contrast, in a case where the charge removing processing is OFF (NO in step S805), the application voltage value is regarded to be zero, and the processing proceeds to step S814.

(Calculation of Correction Value of Application Voltage Value)

Figure 10:
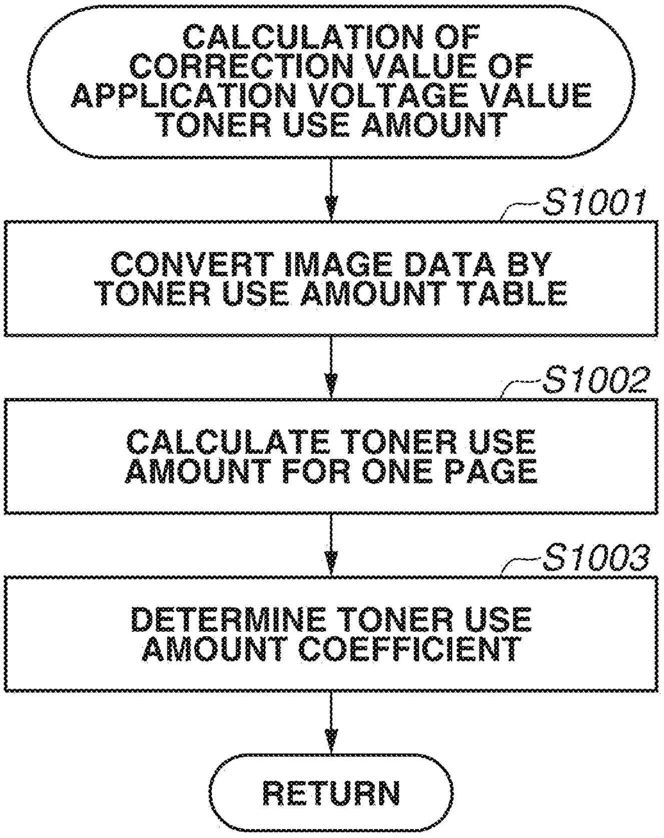
FIG. 10 is a flowchart for determining a toner use amount coefficient.

Processing in step S806 is described with reference to the flowchart in FIG. 10.

In step S806, in order to derive the application voltage value optimum for the received image data, a toner use amount for printing is calculated from the image data, and a coefficient for obtaining a suitable application voltage value corresponding to the toner use amount is determined.

In step S1001, the control unit 205 of the printing apparatus 100 converts the image data on each pixel by using a toner use amount table, to calculate the toner use amount for each pixel. The toner use amount table is a table for converting densities of respective colors of CMYK into toner amounts. In the example of the data illustrated in FIG. 9, toner use amount data 922 is derived from the image data 912 by table conversion using the toner use amount table in step S1001. Note that the image data, the toner use amount data, and the toner use amount described below are present for each of all pixels in a page; however, in the present exemplary embodiment, the image data 911 to 913 are described as examples for purpose of description. The toner use amount data 922 indicates that a toner amount of (C, M, Y, K)=(200, 200, 200, 255) is for a pixel at a coordinate (2500, 3000). Further, a value representing a total amount of toner for the pixel in a value range from 0 to 255 is calculated as the toner use amount. In the case of the toner use amount data 922, a toner use amount 932 can be calculated as 214 from the following equation:

$$(200+200+200+255)/(255+255+255+255)\times 255=214.$$

Likewise, a toner use amount 931 for toner use amount data 921 is calculated as zero, and a toner use amount 933 for toner use amount data 923 is calculated as 214.

The control unit 205 integrates the calculated toner use amounts to calculate a toner use amount for one page.

In the present exemplary embodiment, a toner use amount 940 for one page is calculated while the toner use amount per one pixel is regarded as 214 and a colored area of the image 900 as 4000×7000=28,000,000. As a result, the toner use amount 940 for one page is calculated as follows:

$$28{,}000{,}000\times 214=5{,}992{,}000{,}000.$$

Figure 12:
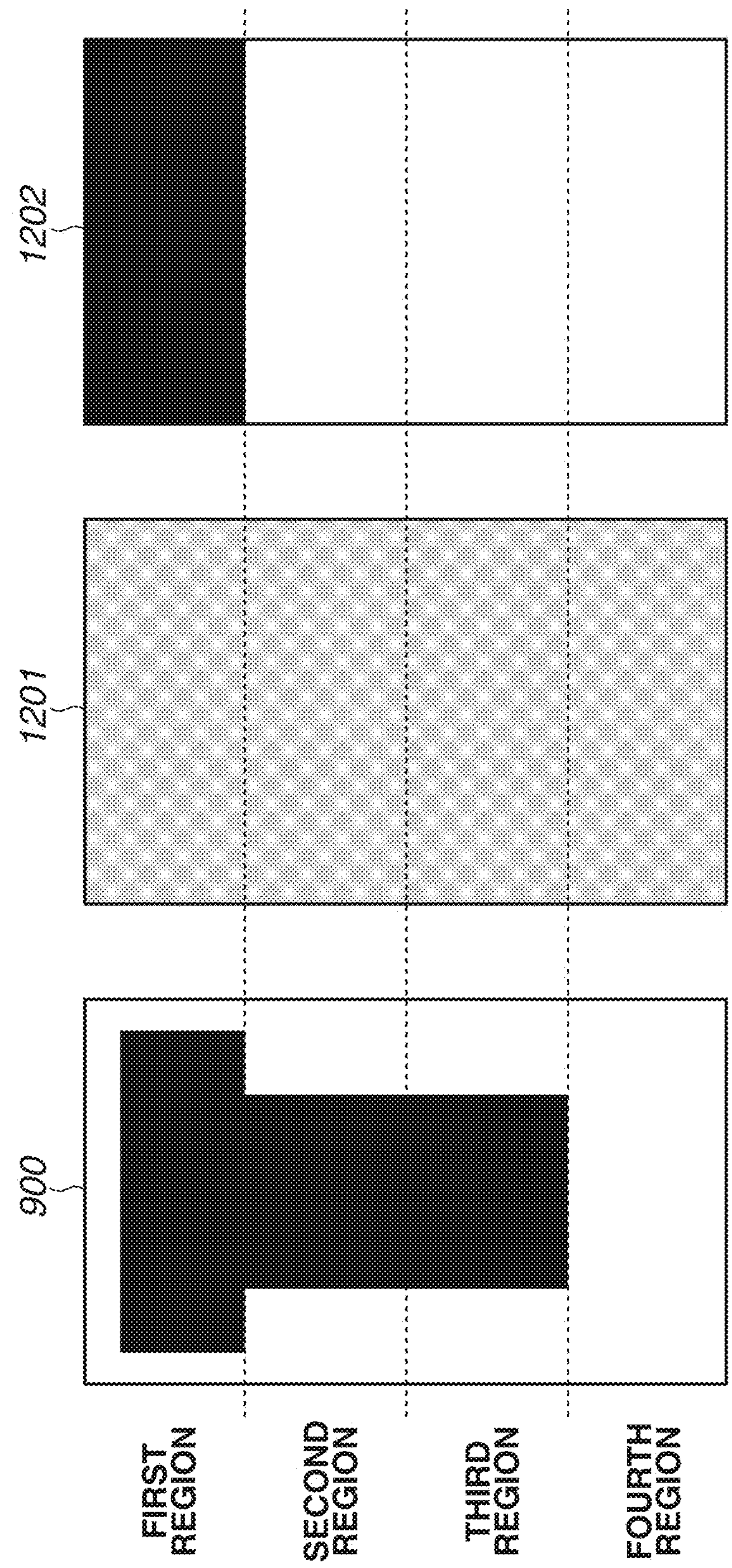
FIG. 12 is a diagram illustrating other print job examples.

While details of calculation are omitted, the calculation is similarly performed on image data illustrated in FIG. 12. As a result, the toner use amount for one page of each of the images 1201 and 1202 is 5,992,000,000 as with the image 900.

In step S1003, the control unit 205 determines a toner use amount coefficient from the toner use amount for one page.

The toner use amount coefficient is a coefficient for correcting the currently-set application voltage value by the toner use amount. In this example, the coefficient is derived for a state where the toner is placed over the entire sheet is defined as 100%. The image 900 has A4 size (the total number of pixels is 4960×7015), and the maximum value of the toner use amount is 255. Thus, the maximum value of the toner use amount for the sheet is calculated as follows:

$$4960\times 7015\times 255=8{,}872{,}572{,}000.$$

In other words, a toner use amount coefficient 950 is determined as follows:

$$5{,}992{,}000{,}000/8{,}872{,}572{,}000\times 100=67.5\%.$$

In FIG. 12, each of the images 1201 and 1202 has A4 size as with the image 900, and the toner use amount for one page of each of the images 1201 and 1202 is also equal to the toner use amount for one page of the image 900. Thus, the toner use amount coefficient of each of the images 1201 and 1202 is also 67.5% as with the image 900.

As the processing in steps S804 to S806, the processing in which the control unit 205 of the printing apparatus 100 calculates the correction value of the application voltage value for the image data subjected to the RIP processing is described in the present exemplary embodiment. Alternatively, the PC 102 that is the information processing apparatus may perform the processing before the print job is transmitted. In this case, the PC 102 inputs the application voltage value (or the correction value of the application voltage value) as the sheet parameter together with the PDL data. Then, the control unit 205 of the printing apparatus 100 stores the application voltage value as the sheet parameter in the HDD 209 when receiving the print job. In this case, the processing in step S806 is not performed, and the processing proceeds to step S807 by using the received application voltage value.

(Adjustment of Application Voltage Value)

In step S807, the control unit 205 adjusts the application voltage value by using the toner use amount coefficient determined in step S806.

Figure 11:
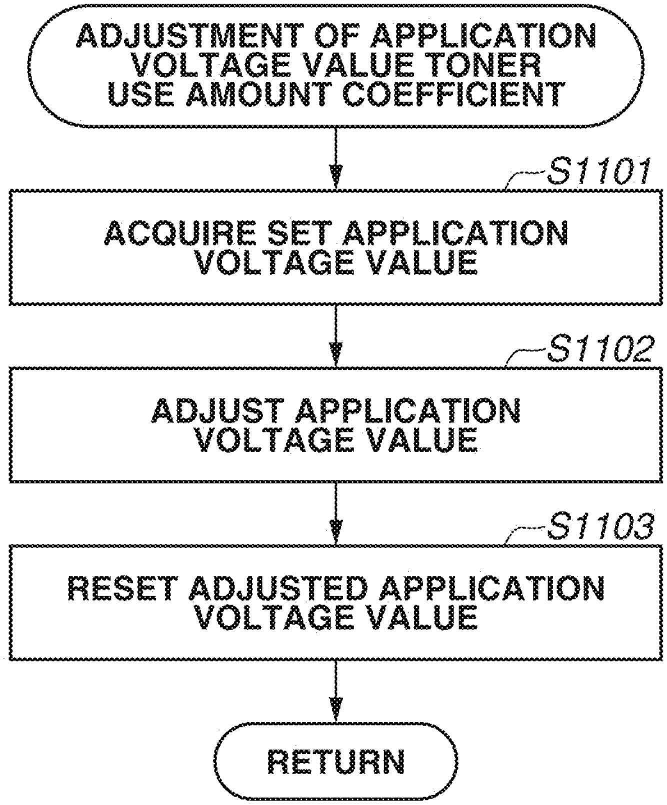
FIG. 11 is a flowchart for determining an application voltage value to be adjusted.

Processing in step S807 is described with reference to the flowchart in FIG. 11. In step S807, the application voltage value preset to the printing apparatus 100 is adjusted using the toner use amount coefficient to determine the application voltage value optimum for the received print job.

In step S1101, the control unit 205 acquires the application voltage value as the sheet parameter, from the HDD 209, set for each sheet type of the print job in the charge removing apparatus 200-3*a*. In the present exemplary embodiment, the acquired application voltage value is +3 [kV].

In step S1102, the control unit 205 adjusts the application voltage value for the image 900 by using the toner use amount coefficient 950 determined in step S806, based on the acquired application voltage value. In the adjustment, first, a charge amount (application voltage value set as the sheet parameter) of a blank sheet (without toner) of the sheet type, and a charge amount of a full solid image with (C, M, Y, K)=(255, 255, 255, 255) are previously measured. Then, the application voltage value is derived by multiplying a difference of the charge amounts by the toner use amount coefficient. For example, in a case where the charge amount of the blank sheet is −1.0 [kV] and the charge amount of the full solid image is −7.0 [KB], it is indicated that a toner layer causes charging of up to −6.0 [kV]. Based on the above, the application voltage value to cancel the charge amount is determined by adjustment of the application voltage value using the toner usage coefficient. In the present exemplary embodiment, since the toner use amount coefficient is 67.5%, the charge amount of the image 900 is estimated as follows:

$$(-1.0)+(-6.0\times 0.675)=-5.1\,[\text{kV}].$$

To cancel the charge amount, the control unit 205 sets the application voltage value of +5.1 [kV] to the charge removing processing unit 503 via the control unit 501.

In step S1103, the control unit 205 resets the application voltage value derived in step S1102 to the control unit 501 of the charge removing apparatus 200-3*a*.

In the above-described example, in step S1102, a flow of processing for adjusting the application voltage value by deriving the coefficient when the state where the toner is placed over the entire sheet is defined as 100% as compared with the blank sheet is described. However, there is a case where the application voltage value is not proportional to the toner use amount depending on the sheet. Therefore, the application voltage value may be adjusted in a stepwise manner based on the sheet characteristics. For example, the application voltage value may be adjusted in a stepwise manner such that an adjustment is unnecessary when the toner use amount coefficient is 70 or less, the application voltage value is set to +1 [kV] when the toner use amount coefficient is 71 to 90, and the application voltage value is set to +2 [kV] when the toner use amount coefficient is 91 to 100.

Figure 8:
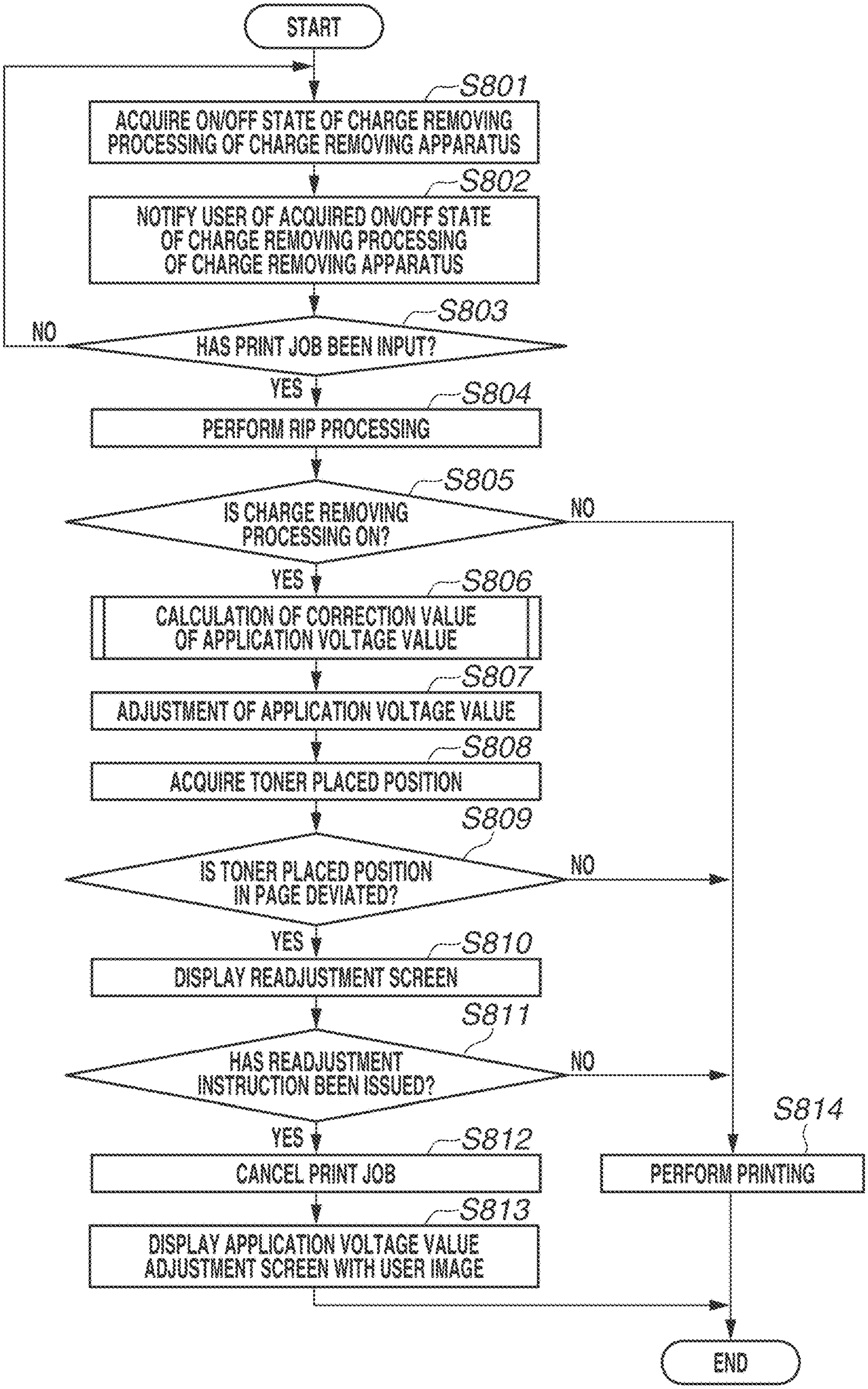
FIG. 8 is a flowchart of basic processing.

Description is again provided with reference to the flowchart in FIG. 8.

In step S808, the control unit 205 of the printing apparatus 100 acquires a toner placed position in the page, and calculates whether deviation is present from a variance value. More specifically, as a calculation method, the control unit 205 divides the page into a plurality of regions and calculates the toner use amount for each divided region. In the present exemplary embodiment, an example in which the page is divided into four regions is described; however, the variance value to the toner use amount may be calculated from the toner use amount of each pixel, in units of scan line or block, or the like. The method of determining the variance value to the toner use amount is not limited. The control unit 205 calculates the toner use amounts of first to fourth regions in each of the images 900, 1201, and 1202 that are divided into four, in a manner similar to the method described in step S806. A table 1300 in FIG. 13 illustrates results (M indicates mega=$10^6$). An average toner use amount of each of the regions in each of the images 900, 1201, and 1202 is 1498M, and the variance values (standard deviations) of the images 900, 1201, and 1202 are respectively 898.8M, 0, and 2594.6M. In determination of presence/absence of deviation of the image, a range of an average value±standard deviation is defined as a threshold, and an image that includes a region having the toner use amount exceeding the threshold is determined to be an image including deviation. The control unit 205 determines that the images 900 and 1201 have no deviation because the toner use amounts of all regions in each of the images 900 and 1201 are within the threshold, whereas the control unit 205 determines that the image 1202 has deviation because the first region of the image 1202 exceeds the threshold. In the present exemplary embodiment, determination of deviation of the toner placed position in the page is statistically described using the variance value. However, for example, the image may be divided, the toner use amount may be compared with a fixed toner use amount as a threshold, and it may be determined that deviation is present when the number of regions each having the toner use amount exceeding the threshold is a certain number or more. Thus, the method of determining whether the toner placed position in the page is deviated is not limited.

In step S809, in a case where the control unit 205 of the printing apparatus 100 determines that the toner placed position in the page is deviated from the result calculated in step S808 (YES in step S809), the processing proceeds to step S810. In contrast, the control unit 205 of the printing apparatus 100 determines that the toner placed position in the page is not deviated (NO in step S809), it is determined that the optimum application voltage value has been set, and the processing proceeds to step S814.

In the case where the toner placed position is deviated, i.e., in step S810, the calculated application voltage value may not become optimum, and electrostatic adhesion may occur. Therefore, the control unit 205 of the printing apparatus 100 displays, on the operation unit 204, a screen for prompting the user to select whether to continue the printing or to adjust the application voltage value.

Figure 14:
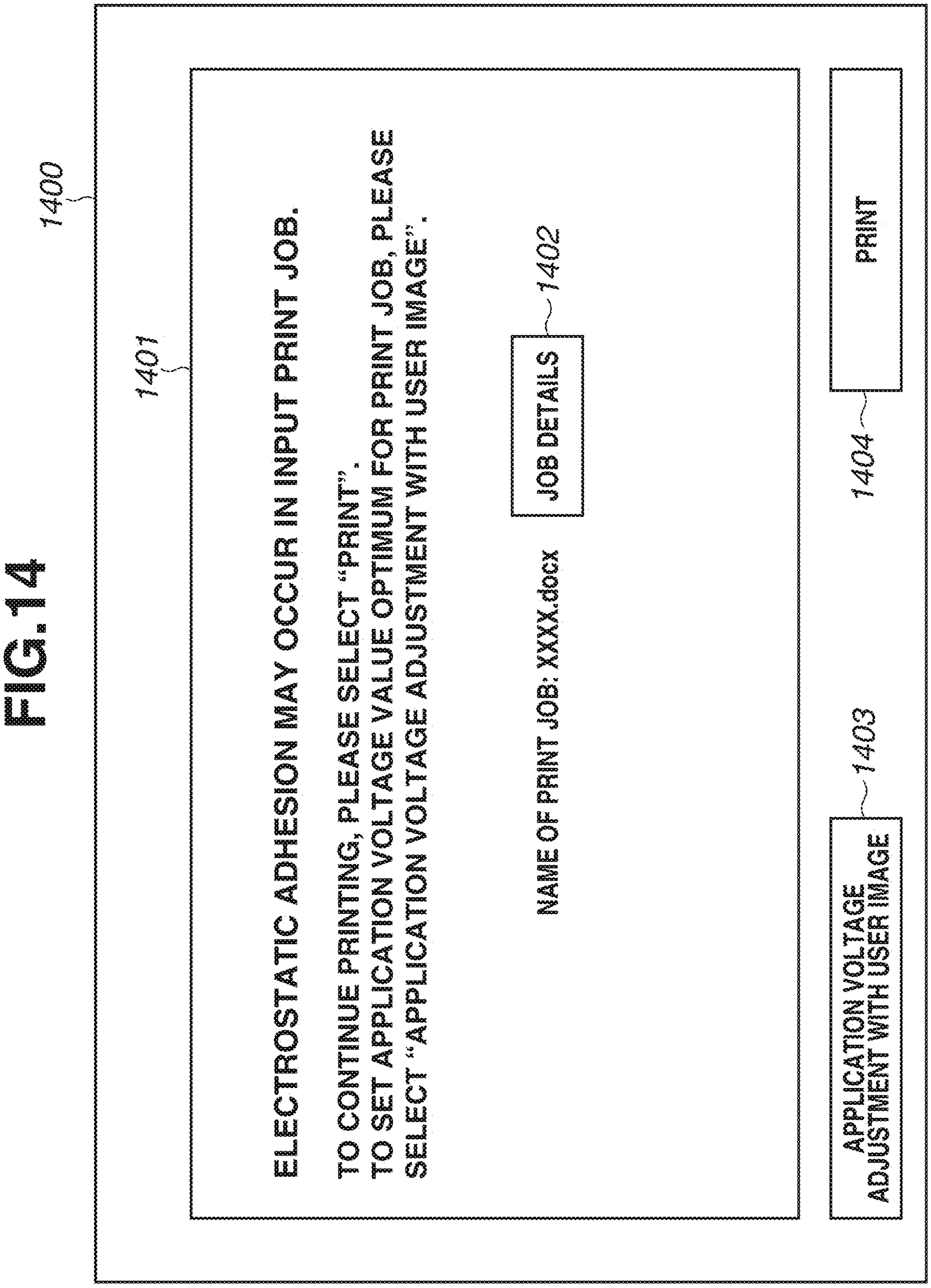
FIG. 14 is a diagram of a user interface (UI) screen in a case where the deviation of the toner placed position is detected.

The screen displayed on the operation unit 204 by the control unit 205 is described using a screen 1400 illustrated in FIG. 14.

The screen 1400 is a screen for prompting, as a result of analysis of the toner use amount and the toner placed position of the input print job, the user to reset the application voltage value optimum for the print job in place of the current setting and the application voltage value adjusted based on the current setting.

A screen 1401 presents a message indicating that electrostatic adhesion may occur at the current application voltage value, and a message prompting the user to select whether to continue "printing" at the current application voltage value or to perform "adjustment" of the application voltage value again, as options for eliminating the electrostatic adhesion.

In a case where the operation unit 204 detects pressing of a "job details" button 1402, the control unit 205 displays detailed information indicating a page of the print job exceeding the threshold, and the like, on the operation unit 204.

In step S811, in a case where the operation unit 204 detects pressing of an "application voltage adjustment with user image" button 1403, namely, in a case where the user has issued a readjustment instruction (YES in step S811), the processing proceeds to step S812. In a case where the operation unit 204 detects pressing of a "print" button 1404, namely, in a case where the user has not issued the readjustment instruction (NO in step S811), the processing proceeds to step S814.

In step S812, the control unit 205 of the printing apparatus 100 cancels the input print job.

Figure 15:
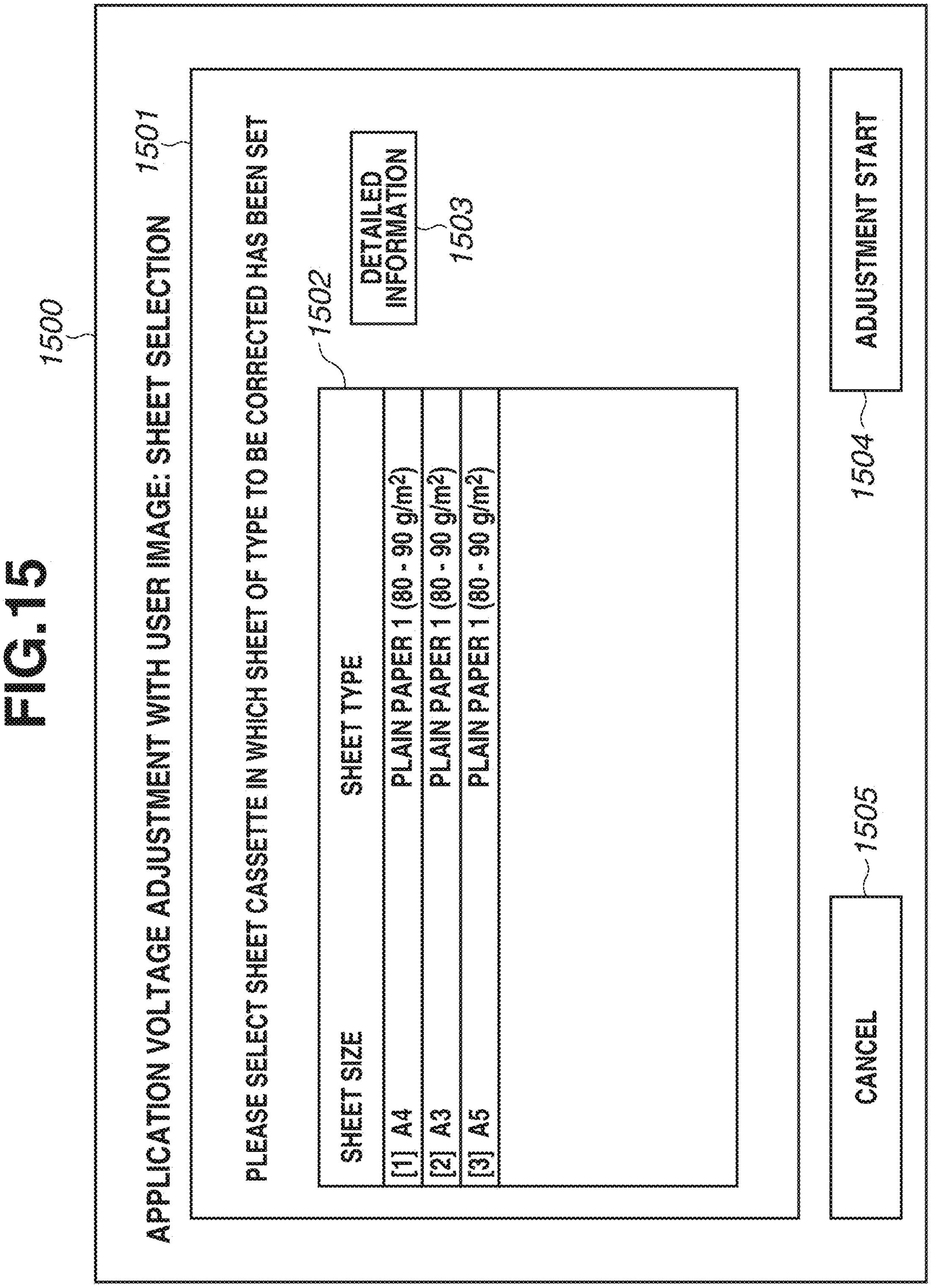
FIG. 15 is a diagram of a UI screen in a case where application voltage adjustment with a user image is performed.

In step S813, the control unit 205 displays an application voltage value adjustment screen with a user image on the operation unit 204. A screen displayed on the operation unit 204 in step S813 is described using a screen 1500 illustrated in FIG. 15. In application voltage value adjustment with the user image, adjustment is performed by using not a chart held by the printing apparatus 100, but the print job used by the user. Thus, the application voltage value optimum for the print job can be set. Therefore, a screen 1501 displays information for selecting a sheet type to be corrected with regard to the print job. A screen 1502 displays that sizes of sheets stored in cassettes 1, 2, and 3 are respectively A4 size, A3 size, and A5 size, and the types of the sheets are plain paper 1.

In a case where the operation unit 204 detects pressing of a "detailed information" button 1503, the control unit 205 displays detailed information on each of the cassettes on the operation unit 204.

In a case where the operation unit 204 detects pressing of an "adjustment start" button 1504, the control unit 205 performs the application voltage value adjustment with the user image. At this time, the processing flow illustrated in FIG. 8 ends.

In a case where the operation unit 204 detects pressing of a "cancel" button 1505, the control unit 205 cancels the application voltage value adjustment with the user image. At this time as well, the processing flow illustrated in FIG. 8 ends.

In the case where the toner placed position in the page is not deviated or in the case where the readjustment instruction of the application voltage is absent, in step S814, the control unit 205 performs the printing processing by the printing apparatus 100 and performs the charge removing processing with the application voltage value adjusted in step S807 by the charge removing apparatus 200-3*a*. In a case where the readjustment instruction of the application voltage is absent and the printing is performed, the discharge destination Z may be designated.

In the case where the charge removing processing is OFF, the printing processing is performed in step S814, and the subsequent charge removing processing is not performed. After the printing processing in step S814 ends, the processing in the flowchart ends.

As described above, in the case where the application voltage value may not become optimum based on the toner use amount used for the sheet to be printed and the toner placed position, readjustment is notified to the user, which makes it possible to prevent occurrence of unexpected adhesion of discharged sheets and to provide appropriate printed matters.

In the above-described exemplary embodiment, in the case where the toner placed position is deviated, the screen for prompting the user to select whether to perform readjustment of the application voltage in the charge removing processing is displayed. Alternatively, the charge removing processing may be performed by dividing a printing region into a plurality of regions and applying a variable application voltage. More specifically, the voltage application controller 321 may control the charge removing roller and the ionizer so as to apply the application voltage corresponding to a charge amount of a passing region of the sheet.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-009867, filed Jan. 26, 2024, which is hereby incorporated by reference herein in its entirety.

What is claimed is:

1. A system including a printing apparatus configured to print an image on a sheet, and a charge removing apparatus configured to perform charge removing processing on the sheet on which the image is printed, the system comprising:

a control unit configured to control an application voltage of the charge removing processing based on a use amount of a recording material for one page of the image;

a determination unit configured to determine whether a recording material placed region in the one page is deviated; and a display unit configured to, in a case where the recording material placed region in the one page is deviated, display a screen for prompting a user to select whether to adjust the application voltage of the charge removing processing, on an operation unit.

2. The system according to claim 1, wherein the determination unit determines whether the recording material placed region in the one page is deviated based on a variance value of a toner use amount in each of a plurality of regions in the one page.

3. The system according to claim 1, wherein, in a case where an adjustment instruction of the application voltage of the charge removing processing is received on the screen, a print job for printing the image is canceled.

4. The system according to claim 1, wherein the application voltage is calculated from image data subjected to raster image processor (RIP) processing to print the image.

5. The system according to claim 1, wherein the application voltage is calculated by an information processing apparatus configured to transmit a print job for printing the image.

6. The system according to claim 1, wherein the recording material is toner.

7. A method of controlling a system, the system including a printing apparatus configured to print an image on a sheet, and a charge removing apparatus configured to perform charge removing processing on the sheet on which the image is printed, the method comprising:

controlling an application voltage of the charge removing processing based on a use amount of a recording material for one page of the image;

determining whether a recording material placed region in the one page is deviated; and displaying, in a case where the recording material placed region in the one page is deviated, a screen for prompting a user to select whether to adjust the application voltage of the charge removing processing, on an operation unit.

8. The method according to claim 7, wherein the determining determines whether the recording material placed region in the one page is deviated based on a variance value of a toner use amount in each of a plurality of regions in the one page.

9. The method according to claim 7, wherein, in a case where an adjustment instruction of the application voltage of the charge removing processing is received on the screen, a print job for printing the image is canceled.

10. The method according to claim 7, wherein the application voltage is calculated from image data subjected to raster image processor (RIP) processing to print the image.

11. The method according to claim 7, wherein the application voltage is calculated by an information processing apparatus configured to transmit a print job for printing the image.

12. The method according to claim 7, wherein the recording material is toner.

13. A non-transitory computer-readable storage medium that stores a program for causing a computer to execute a method of controlling a system, the system including a printing apparatus configured to print an image on a sheet, and a charge removing apparatus configured to perform charge removing processing on the sheet on which the image is printed, the method comprising:

controlling an application voltage of the charge removing processing based on a use amount of a recording material for one page of the image;

determining whether a recording material placed region in the one page is deviated; and displaying, in a case where the recording material placed region in the one page is deviated, a screen for prompting a user to select whether to adjust the application voltage of the charge removing processing, on an operation unit.

14. The non-transitory computer-readable storage medium according to claim 13, wherein the determining determines whether the recording material placed region in the one page is deviated based on a variance value of a toner use amount in each of a plurality of regions in the one page.

15. The non-transitory computer-readable storage medium according to claim 13, wherein, in a case where an adjustment instruction of the application voltage of the charge removing processing is received on the screen, a print job for printing the image is canceled.

16. The non-transitory computer-readable storage medium according to claim 13, wherein the application voltage is calculated from image data subjected to raster image processor (RIP) processing to print the image.

17. The non-transitory computer-readable storage medium according to claim 13, wherein the application voltage is calculated by an information processing apparatus configured to transmit a print job for printing the image.

18. The non-transitory computer-readable storage medium according to claim 13, wherein the recording material is toner.

* * * * *